May 21, 1940.  S. GOLDENBERG  2,201,397
TIRE CHAIN ANCHOR DEVICE
Filed June 22, 1939
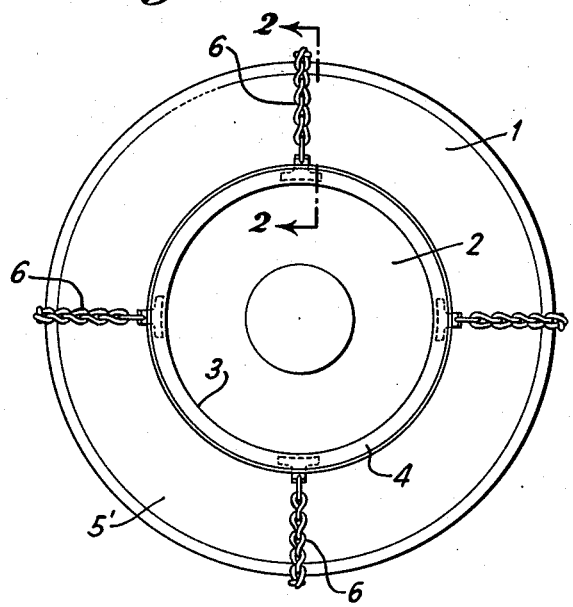
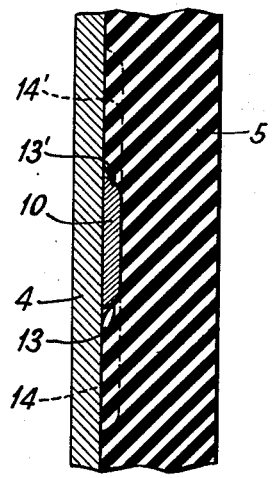
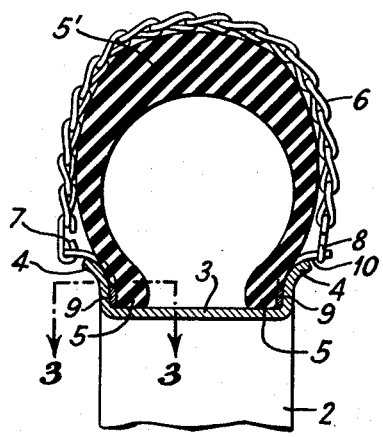
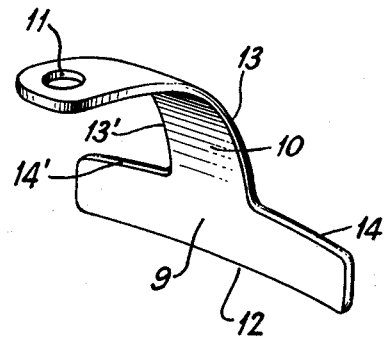
INVENTOR.
SEYMOUR GOLDENBERG
BY Abraham S. Greenberg
ATTORNEY.

Patented May 21, 1940

2,201,397

UNITED STATES PATENT OFFICE 2,201,397

TIRE CHAIN ANCHOR DEVICE

Seymour Goldenberg, Grantwood, N. J.

Application June 22, 1939, Serial No. 280,543

4 Claims. (Cl. 152—233)

My present invention relates generally to tire chain anchoring devices, and more specifically to an anchor device constructed to be retained in position between a tire shoe bead and the wheel rim flange by air pressure.

Many devices exist at the present time for preventing skidding of an automobile tire on slippery surfaces. Anti-skid tire chains, whether fabricated of metal or rubber, have the following disadvantages. Rupture of one chain of an assembly of chains on a wheel requires replacement of the entire assembly, and the replacement is not only expensive but difficult. In the case of wheels of the solid type special types of anti-skid chains are required. Should the weather conditions be such as to make it desirable to remove the chains, the entire assembly on each wheel must be removed. The autoist regards the coming of winter weather with annoyance, so far as auto driving is concerned, since the tire chain problem is a vexatious one.

It may be stated that it is one of the main objects of my present invention to provide devices for securely retaining a tire chain in position around the tire shoe, and yet permitting removal of a chain without disturbance of the retaining devices.

Another important object of my invention is to provide an anti-skid device for tires, the device consisting of an element adapted to overcome skidding tendency of the tire, and a pair of anchor members each constructed and arranged to permit removal of the anti-skid element from engagement therewith, and the anchor members being retained in position between the tire shoe bead and the wheel rim flange by the air pressure within the inner tube.

Another object of this invention is to provide a tire chain anchor device consisting of a substantially T-shaped member, and the vertical section of the latter having the free end thereof bent convexly and being provided with an aperture to receive a terminal of a tire chain.

Still other objects of my invention are to improve generally the simplicity and efficiency of retaining devices for anti-skid members, and more specifically to provide anti-skid tire chain anchor devices which are easily installed and economically manufactured.

The novel features which I believe to be characteristic of my invention are set forth in particularity in the appended claims; the invention itself, however, as to both its construction and method of use will best be understood by reference to the following description taken in connection with the drawing in which I have indicated diagrammatically an embodiment whereby my invention may be carried into effect.

In the drawing:

Fig. 1 shows a side view of an automobile wheel and tire provided with the present invention, Fig. 2 is a section of the wheel of Fig. 1 taken along line 2—2, Fig. 3 is a sectional view taken along line 3—3 of Fig. 2, Fig. 4 is a view in perspective showing one of the anchor devices.

Referring now to the accompanying drawing, wherein like reference characters in the different figures designate similar construction elements, there is shown in Fig. 1 the wheel of an automobile. The wheel comprises the tire 1, and the wheel itself may be of the disc type 2. Of course, any other type of wheel may be employed; as, for example, spoke or wire types. The wheel is provided with a rim 3 between whose flanges 4—4 are located the tire shoe beads 5—5. As is well known to those skilled in the art, the inner tube (not shown in Fig. 2) when inflated maintains the shoe 5' in fixed position on the wheel by virtue of the beads being locked against the rim flanges 4—4. There is a tremendous pressure exerted laterally against the beads and flanges.

When the wheel is of the disc or wire type, it is not possible to employ anti-skid chains of the simple type shown in Fig. 1. Usually a web assembly of chains is used in such a case, and such web assembly is not only expensive in cost and replacement but is difficult to install over the entire periphery of the tire. At the present time the disc and wire type of wheel is becoming universal in use. Hence, it has been a problem to provide anti-skid devices for such wheels without the aforementioned disadvantages. Even in wheels of the spaced-spoke type it is of advantage to use the simple, efficient and inexpensive type of anti-skid chain device.

Assuming, now, that the simple anti-skid chain 6 (shown in Figs. 1 and 2) is desired to be strapped around the face of the shoe, the chain is provided with terminal hooks 7, 8. My invention provides an extremely simple anchor element capable of receiving each terminal hook. In Fig. 4, the anchor element is shown as comprising a T-shaped metal plate having a horizontal section 9 and a vertical section 10 which extends from the middle of the section 9. The section 10 is bent out of alignment with the plane of section 9 so as to have a convex shape. The free end of the bent section 10 is provided with an aperture 11 adapted to receive the terminal hook of a chain.

The lower edge of section 9 is somewhat concave so as to conform to the curvature of the rim periphery. It is preferred to round the edges 13—13' of section 10 from the top edge of section 9 to about the middle of the vertical section. This prevents the edges 13—13' from cutting into the shoe. In actual practice, the width of flat section 10 may be about double that of the flat section 9. Further, the extended wings of section 9 may have a length equal to the width of section 10. The anchor device may be stamped from cold, rolled steel, and the curvature of section 10 is such as to conform to the curvature of the convex flanges 4—4 of the wheel rim.

In order to position each pair of anchor devices, it is necessary to deflate the tire until the horizontal section 9 of an anchor device can be readily wedged between a flange 4 and a bead 5. The tire can be deflated while the wheel is on the axle and the car is jacked up, or the entire wheel can be removed from the jacked-up axle. Assuming that the deflation of a tire is complete, the anchor device is positioned by grasping the free end of section 10 and pushing the edge 12 into the space between bead 5 and the outwardly curved flange 4. Continued pressure finally will force the section 10, in horizontal position, into the approximate position shown in Fig. 2. In such position the lower edge 12 may be in contact with the periphery of rim 3, or it may be very close thereto. The curvature of edge 12, since it conforms to that of the periphery of rim 3, permits section 9 to sit snugly between the bead 5 and lower portion of flange 4. The convex curvature of section 10 conforms substantially to the curvature of flange 4, but the section 10 has a length such that a substantial portion of the free end thereof projects beyond the edge of flange 4. Hence, the aperture 11 of each anchor device can readily be grasped by the terminal hooks of a tire chain, as shown in Fig. 2.

When one, or more, pair of anchor devices have been positioned in opposed relation, as shown in Fig. 2, the tire is inflated to normal operating air pressure. Such normal air pressure is about 30 lbs. per square inch. This air pressure exerts two forces upon each anchor device positively to lock the latter in chain-retaining position. One of these forces is a lateral one; the radial pressure upon the bead 5 firmly sandwiches section 9 between the lower portion of flange 4 and bead 5. The second force is a vertical, downwardly-directed force upon the upper edges 14 and 14' of section 9. The effect of this second force is shown in detail in Fig. 3. Here, the portion of shoe 5' immediately adjacent bead 5 is shown as having its exterior surfaces above edges 14 and 14' in overlapping relation thereto. Due to the rigidity of section 10, and the elastic nature of the shoe, the section 10 actually depresses the surface of the shoe in contact therewith and aids in producing a pair of compression areas on either edge 14 and 14'. In Fig. 2, there is shown pictorially the manner in which the shoe surfaces adjacent bead 5 tend to press down on edges 14 and 14' of section 9.

In Fig. 1 there are shown four pairs of anchor devices in operative position, one face of the wheel being shown. It will now be appreciated that the anchor devices are readily left in operative position at all times. If the use of anti-skid devices is to be dispensed with, it is merely necessary to remove hooks 7 and 8. The anchor devices remain in position without harmful effect on the rim or shoe. As soon as the road conditions, for any reason whatever, warrant use of a device to improve traction, such device need only be fitted to a tire by attaching the terminals thereof to the free ends of each pair of opposed anchor devices. If an anti-skid chain snaps the portions of the snapped chain are easily removed, and a new chain secured to the anchor devices. If the tire flattens, or blows out, the anchor devices are easily removed, and are replaced in position upon replacing the damaged shoe and inner tube. It is only necessary to fit the rear wheel rims with the desired number of pairs of anchor devices at the beginning of winter; thereafter no attention is necessary so far as the anchor devices are concerned.

It is to be understood that the invention is not limited to the specific proportions and configurations stated in connection with the anchor device and rim flange. The rim is merely illustrative, and those skilled in the art are fully aware of the manner of constructing auto wheels. It is to be clearly understood as well that Fig. 2 is purely illustrative insofar as the relations between the anchor device, rim and shoe are concerned. What is essential is that the anchor device comprises a lateral element capable of being positively locked between the shoe bead and rim flange by solely air pressure, and that such lateral element have an element extending therefrom beyond the rim flange edge and constructed to retain the terminal of an anti-skid device.

What I claim is:

1. A tire chain anchor device comprising a horizontal flat metallic plate element, a flat metallic plate element extending vertically from the middle of said horizontal plate element, said horizontal element extending for a substantial distance beyond said middle point on either side of said vertical element, the free end of said vertical element being provided with an aperture adapted to receive a terminal of said chain, said horizontal element having a lower edge which has a concave shape so as to conform to the periphery of a tire wheel rim.

2. An anti-skid tire chain anchor device comprising a metallic horizontal flat plate adapted to be positioned between the tire wheel rim flange and the tire bead, a metallic flat plate extending vertically from the middle of said horizontal plate, said horizontal element extending for a substantial distance beyond said middle point on either side of said vertical element, said vertical element being bent convexly and having an aperture provided adjacent the free end thereof to receive a terminal of said tire chain.

3. An anchor device for an anti-skid device of an auto tire of the type wherein the tire shoe beads are located between the wheel rim flanges; said device comprising a lateral member having a member extending from the middle thereof, said lateral member being adapted to be disposed between the shoe bead and rim flange whereby solely air pressure positively locks said lateral member in said position, said lateral member extending for a substantial distance beyond said middle point on either side of said extending member whereby said air pressure causes said shoe to press downwardly upon the upper edges of the extended portions of said lateral member, and said extending member being provided with means to retain a terminal of said anti-skid device.

4. In an anti-skid chain device for an auto tire of the type wherein the tire shoe beads are located between the wheel rim flanges and retained in position solely by air pressure; the improvement in the chain retaining means which comprises a flat, horizontal plate having a concave lower edge conforming to the periphery of said rim, a flat plate extending vertically from substantially the middle point of said horizontal plate and being bent convexly to receive a terminal of said chain, said horizontal plate extending for substantial distances beyond said middle point on either side of said vertical plate to provide locking wings, said horizontal plate being adapted to be positively locked between the shoe bead and rim flange by a lateral force due to said air pressure and a downward force due to said pressure against the upper edges of said wings.

SEYMOUR GOLDENBERG.